Sept. 26, 1967 G. DUNAND 3,343,186

HIVE

Filed June 3, 1965 7 Sheets-Sheet 1

INVENTOR

GUY DUNAND

By Young + Thompson

ATTYS.

Sept. 26, 1967 G. DUNAND 3,343,186

HIVE

Filed June 3, 1965 7 Sheets-Sheet 2

INVENTOR

GUY DUNAND

By Young + Thompson

ATTYS.

HIVE

Filed June 3, 1965

INVENTOR
GUY DUNAND
By Young + Thompson
ATTYS.

INVENTOR
GUY DUNAND
By Young + Thompson
ATTYS.

INVENTOR
GUY DUNAND
By Young & Thompson
ATTYS.

INVENTOR
GUY DUNAND
By Young & Thompson
ATTYS.

Sept. 26, 1967 G. DUNAND 3,343,186

HIVE

Filed June 3, 1965 7 Sheets-Sheet 7

INVENTOR

GUY DUNAND

BY Young + Thompson

ATTYS.

United States Patent Office 3,343,186
Patented Sept. 26, 1967

3,343,186

HIVE

Guy Dunand, Thonon-les-Bains, France, assignor of fifty percent to Louis Christin, Thonon-les-Bains, Haute Savoie, France Filed June 3, 1965, Ser. No. 461,102
Claims priority, application Switzerland, June 12, 1964, 7,851/64
13 Claims. (Cl. 6—1)

ABSTRACT OF THE DISCLOSURE

A hive has insulated side walls and roof, the thickness of the insulation on the side walls varying progressively from a minimum at the bottom of the walls to a maximum at the top of the walls and at the roof. A feed basin covers the top of the hive just below the roof and has a central opening surrounded by an upstanding flange and a cover spaced from but surrounding the flange, to let syrup but not bees pass through the cover. A foraminous pollen-removing floor may be placed selectively in the path the bees must used.

At present there exist numerous types of hives which have each their particularities and often their own use arising from corresponding working methods. These different types of hives are for example the Dadant hive, the Dadant Blatt hive, the Voirnot, Layence, Langstrothe hives, etc. In each of these types of hives one further distinguishes different executions according to their use, hives for the production of honey, wax, pollen, small hives for swarms, small hives for queen-bees.

Up to the present these various hives are generally made of wood from which arise certain disadvantages the principal ones being the following:

(1) Rapid deterioration upon exposure to the elements.
(2) Damage due to insects and rodents.
(3) Insufficient thermal insulation which renders the breeding of bees particularly delicate in cold regions during winter.

The present invention has for object a hive tending to eliminate the above mentioned disadvantages due to the fact that the walls of the hive body and the flooring comprise a central part in an insulating material coated with a resistant and water-tight outer housing. By "resistant" is meant that this outer housing is particularly resistant to bad weather and is rot-proof, that it offers mechanical resistance as well as high resistance to shocks, that it is not attacked by certain chemical products, in particular those used when disinfecting the hive, and that these properties are not unfavorably affected by age.

The accompanying drawing shows diagrammatically and by way of example various embodiments of the hive.

Figures 1, 2:
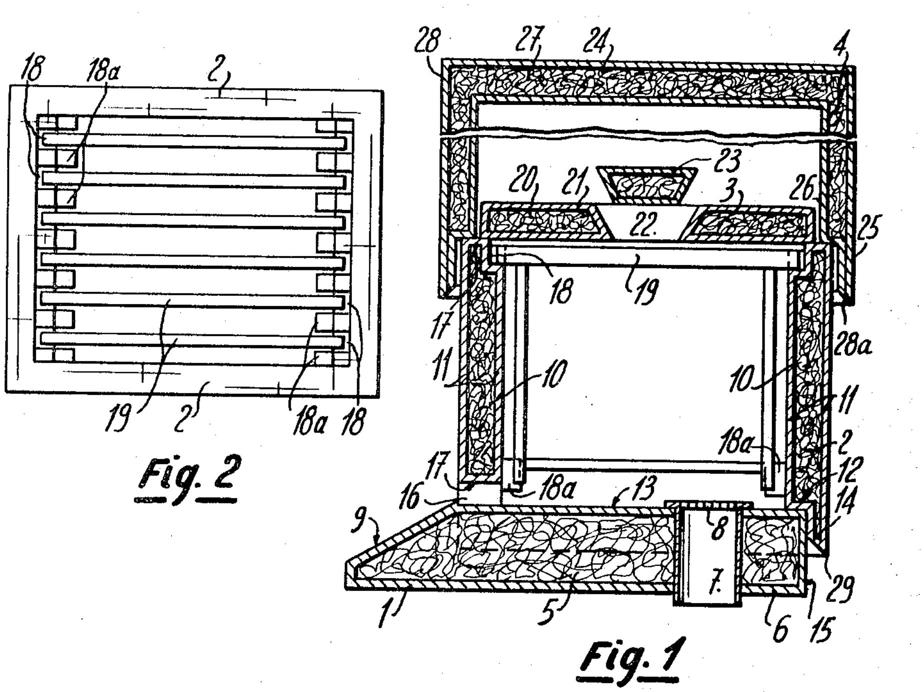
FIG. 1 is an elevation in section of a first embodiment of the hive.
FIG. 2 is a view from above, certain parts being withdrawn from the hive shown in FIG. 1.
Figure 3:
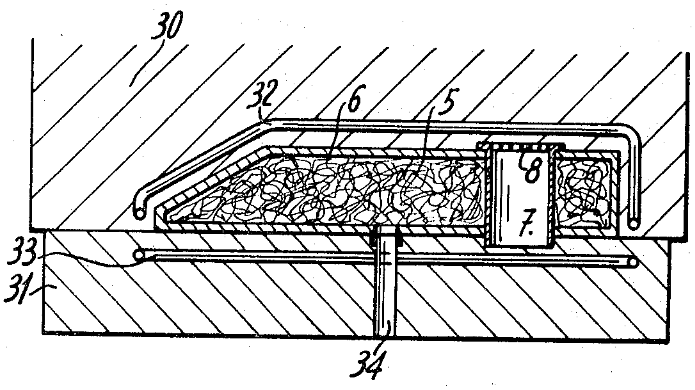
FIG. 3 is a sectional view of the floor of the hive shown in FIG. 1 in the course of its manufacture.

The hive shown in FIGS. 1 to 3 is composed of partial elements i.e. a floor 1, a hive body 2, a cushion 3 and a roof 4. These partial elements are adapted to be laid one over the other to form a complete hive.

The floor 1 is formed of a central or inner part 5 of multicellular material, for example hard expanded polyurethane foam, coated with an outer housing of hard plastic material, for example a resistant and water-tight stratified resin of glass and polyester. This floor 1 has, seen in plan, a rectangular shape and comprises adjacent its rear side one or several ventilating funnels 7 provided with a grid 8 preventing the introduction of foreign bodies or animals inside the hive. These funnels 7 permit efficient ventilation of the hive, even when the flight hole is accidentally closed, by snow in winter for example.

The front part of the floor has an inclined plane 9 constituting the flying-off board.

The hive body 2 has the general shape of a tube of quadrangular cross section the walls of which comprise a central or innner part 10 of multicellular material covered by an outer housing 11 of hard plastic material, such as resistant and water-tight stratified resin of glass fibers.

The lower part of this hive body 2 comprises on three sides a shoulder 12 adapted to rest on the edge of the upper surface 13 of the floor 1. All around this shoulder 12 a skirt 14 extending downwardly is adapted to enter into contact with the side sections 15 of the floor 1 in order to determine the exact position of this body 2 on the floor 1. The fourth side of the hive body 2 has a notch 16 so as to provide, when the hive body 2 is in working position on the floor 1, a flight hole 16 constituted by a slot above the upper surface 13 of the floor.

The upper section 17 of the walls of this hive body 2 has on two opposite sides housings 18 adapted to receive the ends of the upper cross-member 19 of each frame to be disposed inside the hive body 2. The lower part of the walls provided with housings 18 comprises projections 18*a* between which are housed the lower edges of the frames. These housings 18 and projections 18*a* permit an exact and easy positioning of the frames.

The cushion 3 is constituted by a plate the dimensions of which are slightly larger than the section of the free space inside the hive body 2 and comprises a central part 20 of multicellular material covered by an outer housing 21 of resistant, water-tight hard plastic material such as a glass stratified resin.

In a variant not shown the outer housing 21 of the cushion 3 could be eliminated. This cushion is adapted to close the top of the hive body 2. This cushion 3 further comprises a conical opening 22 which may be closed by a plug 23, constituted like the cushion 3. This opening is provided for the feeding of the bees.

Finally the hive further comprises a roof 4 comprising a flat upper part 24 and a skirt 25 the inner height of which is at least equal to the height of two raising bodies (not shown).

In fact, this roof is adapted to envelop entirely the raising body or bodies which might be placed above the hive body and prolong the latter upwardly.

The lower part of the skirt 25 of the roof 4 comprises a shoulder 26 adapted to fit on the upper part of the hive body 2. The walls of this roof also comprise, in the embodiment shown, a central or inner part 27 of multicellular material covered by a housing 28 of water-tight, resistant, hard plastic material, such as fibre glass stratified resin. However, in a variant not shown, the walls of the roof do not comprise central parts and are formed merely by two resistant plates or sheets joined one to the other, or even by a single sheet of plastic material.

Due to the use of resistant and impervious plastic material, it is possible to provide a roof having a horizontal upper wall, which is very practical for the user, because this roof may serve as a table on which to lay the tools necessary for the care of the bees.

It is to be noted that the lower end of the side walls of the roof 4 and of the skirt 14 of the hive body is, seen in section, chamfered in order to prevent the water running along the side walls of the roof 4 or the hive body from, through capillarity, being introduced into the hive. In fact, this feature permits of driving away the drops of water forming on the ridges 28a, 29 of the contact surface between the roof and the hive body and between the latter and the floor.

It is possible to provide attachment members of known type permitting of fixing the body of the hive to the floor and the roof to the hive body in order to prevent any untimely dismounting of the hive.

In the case of small hives for swarms, breeding of queen-bees, etc., the floor is generally made of one piece with the side walls of the hive body.

In a variant not shown, the flying-off board could have the general shape of a parallelogram, the outer edge being shorter than the width of the hive body. The rear part of the floor could then comprise a recess of shape corresponding to that of the flying-off board. Such a conception of the hive permits, during transport, of fitting the flying-off boards under the body of the preceding hive, which permits of saving space on the one hand, and on the other hand of holding the hives one against the other during transport.

The described hive has numerous advantages relative to existing hives of which the main ones are the following:

(1) Lightness.
(2) Practically unlimited life due to the use of rot-proof materials.
(3) Possibility of permanent colouring through colouring of the mass of plastic material.
(4) Considerable insulating power which is essential especially to ensure a suitable breeding of bees.
(5) Possibility of proceeding with disinfection by means of liquid or powder chemical products.
(6) Rapid and easy cleaning.
(7) Not attacked by rodents.

Tests undertaken have proved that the plastic material is satisfactorily tolerated by the bees and that such hives permit of increasing the efficiency of bee-keeping and of facilitating the breeding of bees and queen-bees.

One embodiment of the present invention has been described by way of example but it is obvious that numerous variants could be foreseen without departing from the scope of protection claimed. In particular, the shape and the dimensions of the hive could be modified and adapted to any one of existing types of hives. Handles could be fixed to the roof and to the hive body with a view to facilitating transport.

It is obvious that orifices could be provided in one or the other of the walls of the hive body to permit the adjustment of feed-basins. Moreover, a hive comprising a roof provided with a horizontal upper wall has been described but it is evident that the hive could comprise a roof with one or two inclined faces.

Further, it is obvious that the outer housing of each partial element of the hive could be in the form of another embodiment, constituted by crossed sheets of wood, of "Formica," metal or plastic material, or synthetic resins. These water-tight and mechanically resistant outer sheets could be fixed, for example by gluing, against the central portion formed by a multicellular insulating material. Moreover, this central portion could be constituted by an insulating material but not multicellular such as cotton-wool or glass-fibre, the object aimed at being the thermal insulation of the hive. In certain variants one could use for this central portion emulsified plaster, emulsified cement, emulsified glue or even wood shavings.

Various methods of manufacture may be considered for the production of the hive described. In particular, two main methods are:

(a) Use of a core or solid central portion and fixing by gluing or any other means of the outer walls or housings to said core.

(b) Formation of the outer housing and filling the inside of the latter with an emulsifying or expansible and hardening liquid or pasty material.

When one produces a hive such as the one described of which the housing is of plastic material or synthetic resin and the core of plastic material or expanded multicellular synthetic resin, the second method of manufacture is preferred.

With reference to FIG. 3, it is possible to carry out an especially advantageous manufacture by proceeding in the following manner:

One forms each partial element of the hive in a corresponding mould including at least two parts 30, 31. Each part of this mould is maintained at a desired temperature by means for example of a hot oil circuit 32, 33. The mould being open, one projects on its inner surfaces a plastic material or a synthetic resin in which is incorporated a mass of glass fibres or other fibres cut into small pieces to form a layer adapted, after hardening under the action of catalysers and other adjuvants, to form the mechanically resistant housing of the partial element. Then one closes the mould and injects inside the same and therefore inside the housing, through the orifice 34, a plastic foam or a liquid synthetic resin to which is added adjuvants producing the expansion of the foam or of the liquid until complete filling of the inner space of the housing and then its hardening. This plastic material or expanded synthetic resin then constitutes the multi-cellular central portion 27.

It is obvious that one closes the two parts of the mould one on the other before the hardening of the layer of plastic material or synthetic resin projected on these inner walls. In this manner, when the mould is closed, the two parts of the housing are automatically welded one to the other at the joints of the mould.

In order to facilitate this manufacture and avoid a burring of the edges, one can also provide in the angles of the hive body pieces of wood over which one may fold the layer of stratified resin before its hardening. One can proceed in a like manner for the floor by disposing pieces of wood over its whole periphery.

The first embodiment of the hive already described is a simple hive which has in particular been chosen to show the carrying out of the method of manufacture also described above. In fact, the hive described and illustrated in FIGS. 1 to 3 may be produced with simple and cheap moulds. It is obvious however that the method may be carried out in various ways as concerns the details of execution of the hives, in particular the hives of the embodiments described above which are more elaborated and adapted to the particular needs of bee-keeping specialists may, by means of suitable molds, be produced according to the method described.

In what follows will be described two embodiments of hives by way of non limiting example in order to show other characteristics of the present invention. It is moreover obvious that the characteristics due to the materials used in the manufacture of the hive are again to be found whatever the form or complications of the latter. These characteristics will therefore not be repeated here.

Practical tests as well as the observation of wild bees and wasps have shown that the ideal hive must have the following qualities:

be very warm in winter
cool during the summer
absolutely water-proof at the top
well ventilated at the bottom
not be damp
be simple, strong, practical and lasting.

A bee instinctively searches for the best conditions and normally finds them in nature. The bee makes use of the crevices in hollow trees which exist near the ground in order to penetrate therein.

They build their combs under the inner vault where warm air accumulates.

During the warm season of the year, the bees congregate at the bottom of the combs, then when the cold comes, they move to the upper warm part.

The best would therefore be a hive in the shape of a bell the bottom of which, very open, allows fresh air to penetrate, the walls of the latter thickening more and more towards the top and insulating more and more the body of hot air maintained under the cover. The warm air rises in the centre, dries due to the rise of temperature, then cools slightly and slowly in contact with the walls and tends to fall again along the latter. Cooling more and more it resumes its moistness which comes out in the form of steam without having rested against the cold walls.

The tests have shown the necessity of rendering water-tight the roof and the walls, and also of not preventing the air flow from reaching under the roof.

The hive illustrated in FIGS. 4 to 30 is a Dadant hive (12 frames) of a type generally well known throughout Europe and comprising a body 35, a roof 36 and a flight device 37.

The body 35 is moulded in a single piece and is formed of a core of rigid and strongly insulating foam covered on each side with a thick and very solid layer of polyester reinforced with glass and coloured in the mass. The floor 38 is integral with the body. It is flat underneath, and slightly inclined forwardly to permit of harmful gases being discharged by the air flow in the direction of the flight hole.

Two holes 39 with gratings and disposed in each rear corner of the floor ensure ventilation even if the flight hole is closed.

The roof 36 is made of the same material as the body which permits of eliminating the wintering cushion due to its thickness and its great insulation. Male formations (40) fit on to the hive body 35 and hold it well in place. The clearance 41 and the foam joint 42 glued to the roof ensure perfect water-tightness and prevent any entry of water by capillary action. A cap of flexible foam 43 holds a plug 44 of an upper feed-basin 45 in operating position.

The flight device 37 is incorporated in the floor with fixed base and is combined with a feed-basin across which the bees must pass in the course of their normal travels and a pollen trap. This flight device comprises:

(a) A drawer 46 forming a flight board having three access slopes 47, 48, separated by two small vertical partitions 49. The two outer slopes 48 are fixed while the central slope 47 includes a movable portion 50 pivoted by means of pins 50′ in notches 50″ made in the upper surface of the drawer 46. According to the position occupied by the drawer 62 relative to the floor 38 of the hive, the movable part or flap 50 constitutes the extension of the middle slope 47 or on the contrary gives access to a pollen container described hereafter.

(b) A feed-basin 51 comprising a container 52 adapted to receive sugar syrup and two feeding-troughs each constituted by a slope 53 extending to the bottom of the container 52 and separated from the latter by a grid preventing the bees from penetrating into said container 52. This feed-basin is fixed, for example by welding or gluing, under the drawer 46. The slopes 53 are extensions of slopes 54 in the drawer 46 and connect these feeding-troughs inside the hive. The drawer 46 further comprises an opening closed by means of a sliding cover 55 permitting the filling of the feed-basin.

(c) An exit for males 56 is disposed in one of the ends of the drawer 46. This exit for males is formed by a passage 58 emerging from the hive and giving access to the slope 54 of the drawer 46. A lid 57 allows, according to its position (FIGS. 11 to 13) either of closing the passage 57 as well as the access to one of the feeding-troughs, or of uniting the slope 54 with the exterior of the hive and obtaining access to the feeding-trough, or again of opening the access to the feeding-trough but closing the access to the slope 54 from the outside of the hive.

(d) A false floor 59 comprises a perforated portion 60 and a front flange 61 set at 90° relative to the plane of the false floor. This front flange 61 comprises two portions disposed at substantial angles to the slopes 48 of the drawer. According to whether the false floor 59 is inserted in one direction or the other, these parts of the flange 61 close or not the side slopes 48 giving access inside the hive. The perforated part of this false floor has holes permitting the passage of a bee and acts as a pollen grid that is to say a scraper to cause the pollen to fall from the legs of the bees when they pass through these holes.

Below the perforated part 60 of the false floor 59, that is to say directly behind the container 52 of the feed-basin is placed a pollen drawer 62. This drawer 62 may be withdrawn from the hive sideways and comprises perforations 63 made in its base. These perforations 63 are, in the non-operating position of the drawer 62, in line with the perforations 64 made in the bottom of the floor 38. These perforations 63 and 64 thus provide efficient low ventilation and are of such size that a bee may pass through them. In the operational position of the pollen drawer 62 a grid 65 is placed on the bottom of the pollen drawer 62 to prevent the bees from escaping by these perforations.

The front wall 66 of this drawer 62 enters into contact, depending upon the position of the drawer 46, with the flap 50 and causes it to swing to the high position. However, when the pollen drawer is withdrawn, the said flap returns to the low position. The inner end 67 of this front wall is inclined rearwardly so as to form a cam and permit the insertion of the drawer 62 when the drawer 46 is in the rear position causing the movement of the flap 50.

A second grid 68 resting on cross-members **46*a* of the rear portion of the drawer 46 is placed just above the pollen drawer 62** when the latter is in operational position thus preventing the bees from penetrating into the latter.

Figures 4, 5, 6, 7, 8, 9, 10:
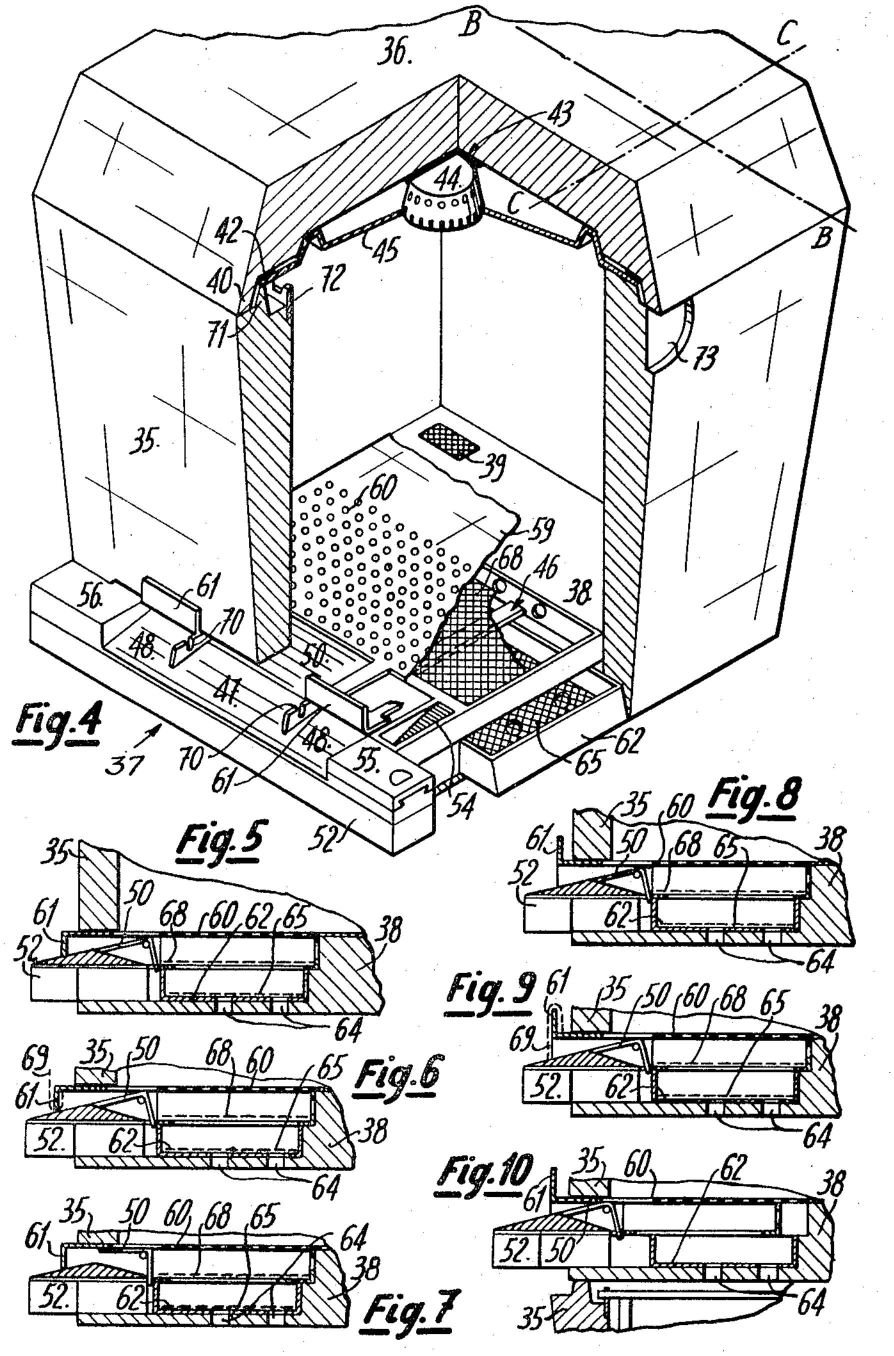
FIG. 4 shows a second embodiment of the hive.
FIGS. 5 to 10 are partial views of details showing different positions of the flying-off device, that is, the structure from which the bees leave the hive.

The arrangement described of the floor permits the following operations:

(a) *FIG. 5 Wintering.*—The false floor 59 is turned so that the front edge 61 closes the side slopes 48. The flight hole is thus reduced to the single central slope 47. The drawer 46 is not pushed in to the utmost so that the flap 50 is in the low position. The bees may then have access by the slope 47 directly to the hive body.

(b) *FIG. 6 Transport in winter.*—Same position as the one shown in FIG. 5. Access to the central slope 47 is however closed by means of a grid 69 fixed to the front flange 61.

(c) *FIG. 7 Gathering of pollen.*—Same position of the false floor as in FIG. 5 but the drawer 62 is pushed in to the innermost position so that the central slope, alone open, gives access above the perforated portion of the false floor 59. In order to return into the hive, the bees are obliged to pass through the false floor which rids them of their pollen which falls through the large mesh grid 68 onto the fine mesh grid 65 resting on the bottom of the pollen drawer.

(d) *FIG. 8 Honey collecting.*—The false floor 59 is turned over freeing the side slopes 48 and the drawer 46 is in the same position as that in FIG. 5 so that all the slopes give access directly into the body of the hive.

(e) *FIG. 9 Summer transport.*—Same position of the floor 59 and drawer 46 as in FIG. 8 but the grid 69 is placed so as to close the access slopes 47, 48.

(f) *FIG. 10 Superposition of two hives.*—Same position of the false floor 59 as in FIG. 8 but the drawer 46 is pulled forward so that the three accesses are closed, the top of the slopes 47, 48 coming to register with the front partition of the hive, and the grids 68 and 65 are withdrawn so that the bees may issue by the perforations 64 of the floor and proceed into another hive which has been placed underneath.

The flight device further comprises a drone trap (FIG. 16 which is a one-way exit) formed by a rake **70*a* which may be fixed in front of the accesses to the hive by engagement in notches 70 made in the walls 49 separating the slopes 47 and 48**. The pitch of this rake is such that it allows the workers to pass but not the drones. When a drone goes out, the rake moves angularly upwards but when this drone wishes to return it remains against the rake which cannot move angularly in the direction of the hive.

The upper section of the wall of the hive body 35, having a thickness greater than at the base of this body, has a middle ridge 71 adapted to enter into contact with a corresponding part of the roof 36 of the hive in order to center the latter on the body of the hive 35. The front wall and the rear wall of the hive are provided along their inner upper edge with notches 72 permitting the positioning and the suspension of a frame of standard dimensions.

The two side faces of the hive have recesses 73 constituting handles by which it is possible to raise the cover or roof 36 of the hive. Upper superhives 74, hereinafter called "supers," may be provided to permit the main gathering of honey due to a surplus stock. These upper supers have the shape of an open frame of square cross section and have dimensions such that they may be superposed on the body of the hive and piled one on the other. These upper supers 74 are provided with a water-tight joint 75 at their lower edges which when they are piled on the body of the hive or one on top of the other enters into contact with the ridge 71 of said body or of the upper super disposed directly under the upper super under consideration. These upper supers have as in the case of the upper edge of the hive body 35 a notch adapted for the fixing and the positioning of the frame inside the same.

Figure 29:
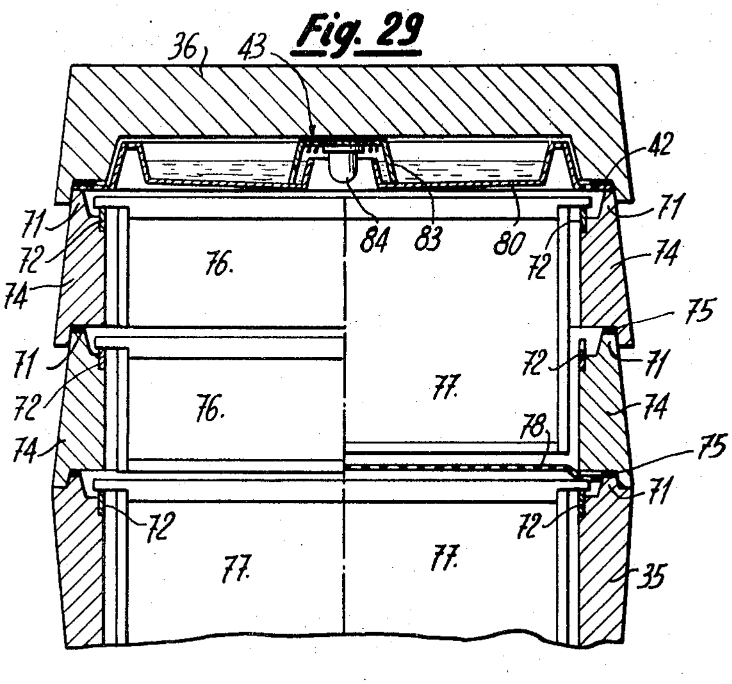
FIG. 29 shows two partial semi-sections illustrating various uses for the hive.
Figure 30:
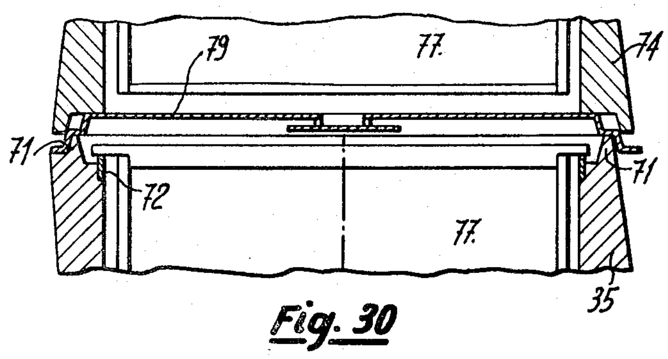
FIG. 30 illustrates a partial section showing a separation between the body and cross-member of the hive.

These upper supers are moulded in the same material as the body and the roof of the hive. The height of the upper supers is approximately equal to half that of the body of the hive so as to be able to contain semi-frames and for these to be placed in operating position approximately 7 mm. above the frames placed in the body of the hive. The left hand side of FIG. 29 shows a hive body surmounted by two upper supers and a cover or roof. Inside each upper super are placed semi-frames 76 while inside the body of the hive are placed frames 77. On the other hand, the right hand side of FIG. 29 also comprises two upper supers superposed above a hive body but inside these two upper supers are disposed whole frames 77. When one utilizes this arrangement and places between the frames disposed inside the two superposed upper supers and those placed inside the hive body, a queen-bee grid the meshes of which allow the worker bees to pass but not the queen-bees, it is possible to block laying in the upper large frames. This blocking of the laying in two upper supers has the advantage of not mobilizing two hive bodies which would be more costly than the use of two upper supers and reduces the number of spare parts of an apiary.

In order to facilitate the gathering once the frames disposed in the upper super are full one disposes between this upper super and the hive body a bee-excluding plate 79 of stratified polyester and the edges of which form two steps so that it may be placed either between the body and the upper super of a hive or between two superposed upper supers. This bee-excluding plate comprises a one-way escape box disposed in its centre. This one-way escape box is of normal type and allows bees to pass from the upper super into the hive body but not in the reverse direction.

Figures 11, 12, 13, 26, 27, 28:
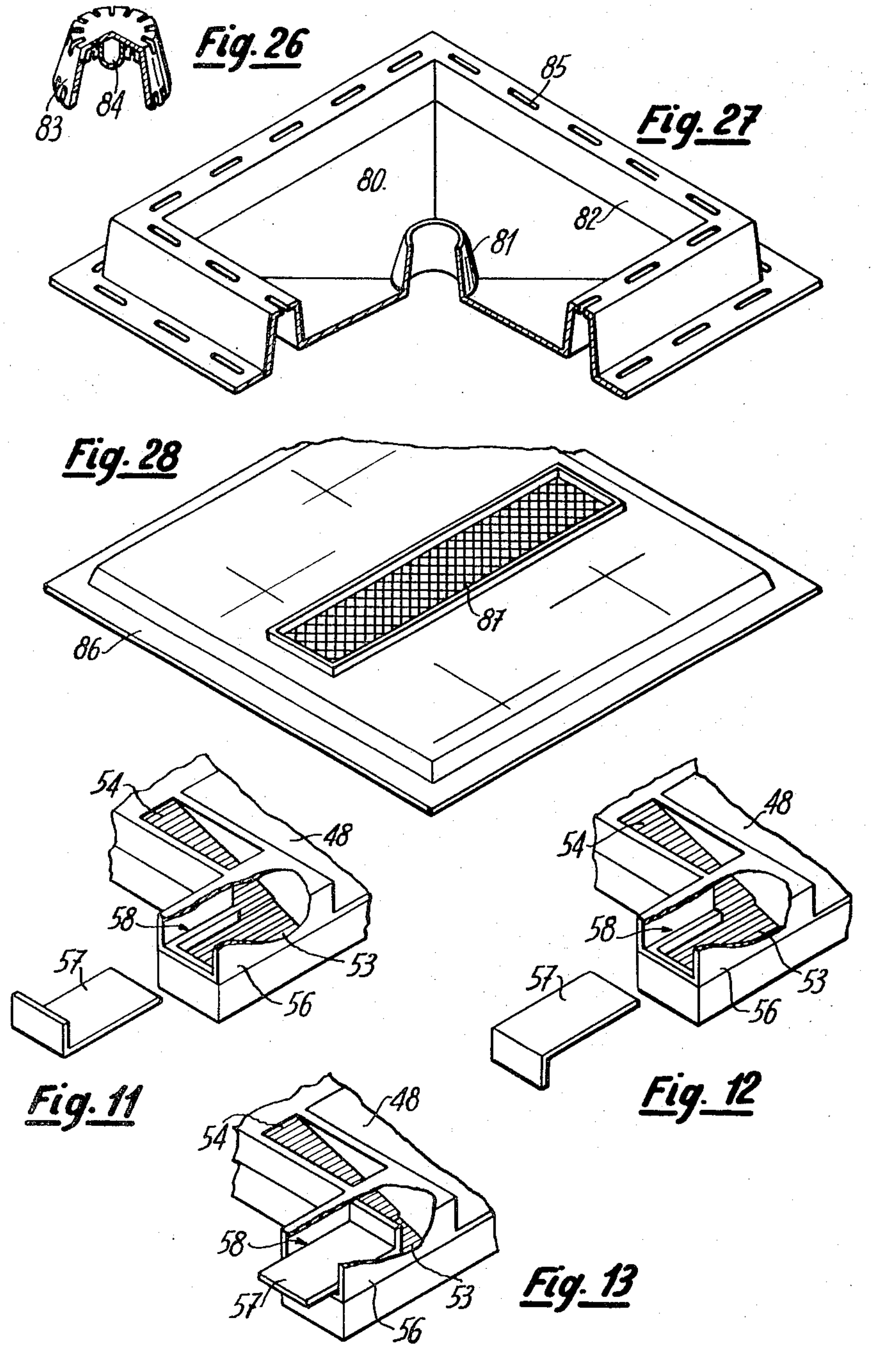
FIGS. 11 to 13 show different positions of an exit for males.
FIG. 26 shows an element of the upper feed-basin.
FIG. 27 shows another element of the upper feed-basin.
FIG. 28 shows a special roof for transport.
Figures 14, 15, 16, 17, 18, 19:
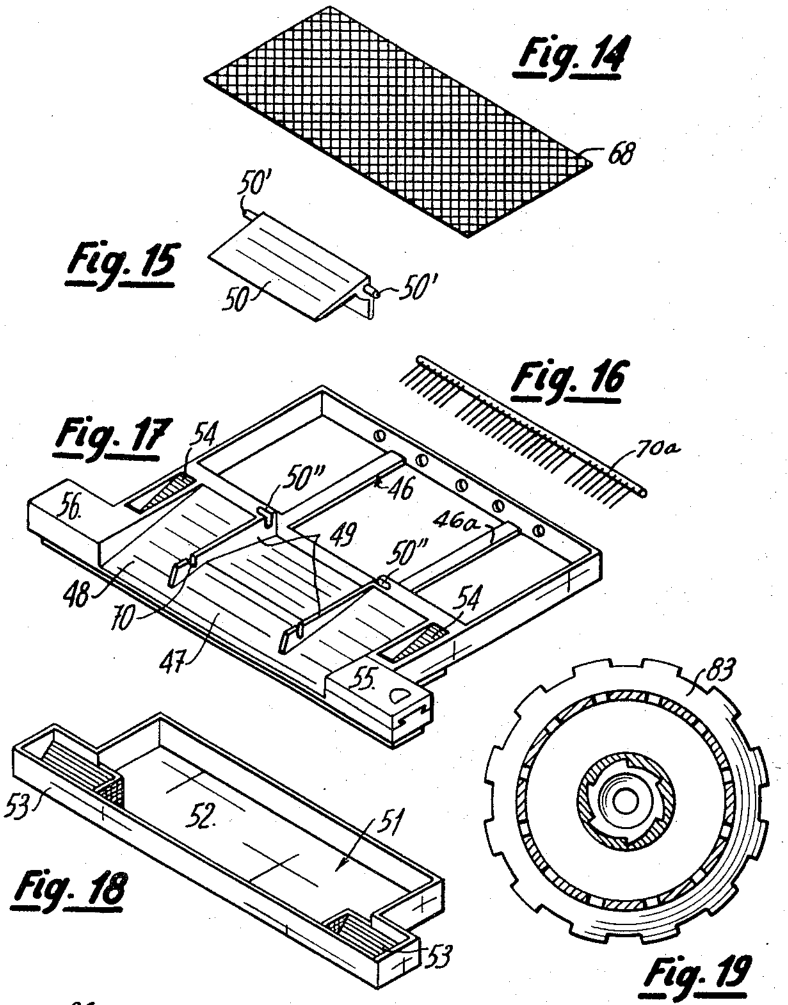
FIG. 14 shows a pollen trap.
FIG. 15 shows a swinging incline for the flying-off device.
FIG. 16 shows a trap for males.
FIG. 17 shows a part of the flying-off device.
FIG. 18 shows a feed-basin forming part of the flying-off device.
FIG. 19 is a section along line A—A of FIG. 20.
Figure 20:
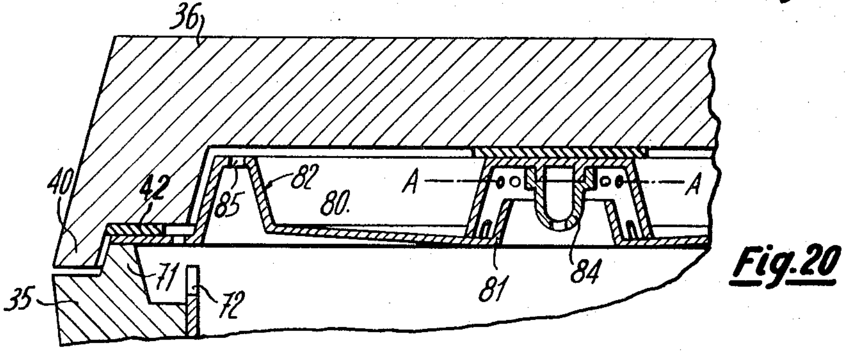
FIG. 20 is a partial section showing an upper feed-basin.
Figure 21:
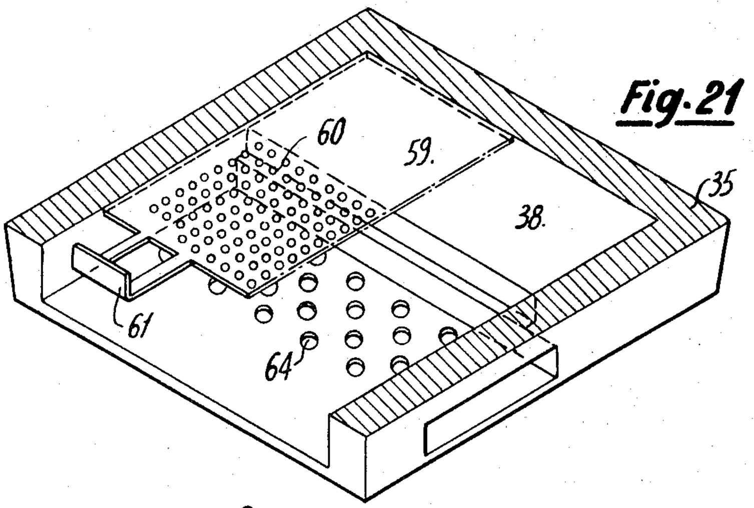
FIG. 21 is a horizontal section showing the bottom of the hive floor.
Figures 22, 23, 25:
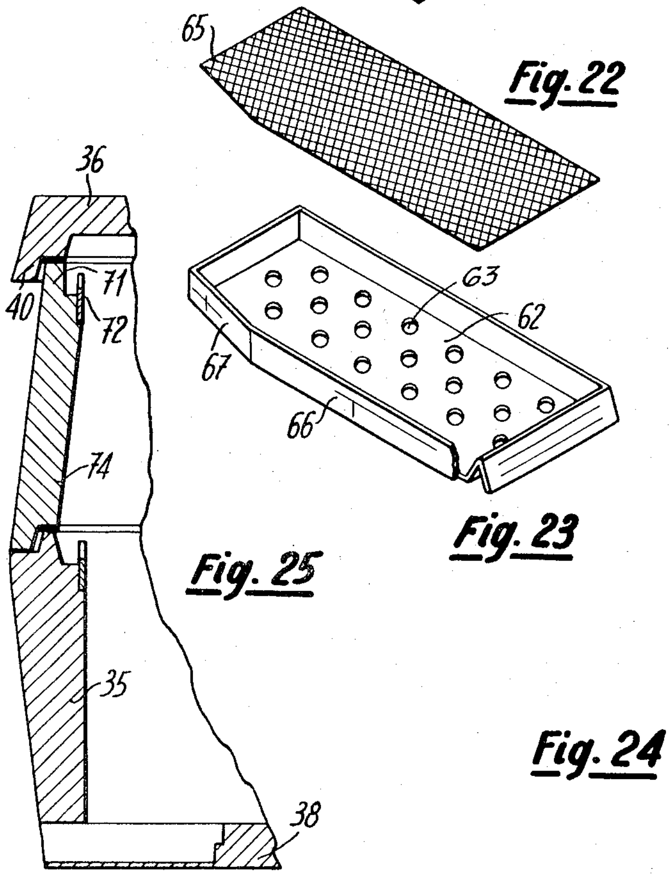
FIG. 22 is a pollen grid.
FIG. 23 is a pollen drawer.
FIG. 25 is a partial section along line C—C of FIG. 4.
Figure 24:
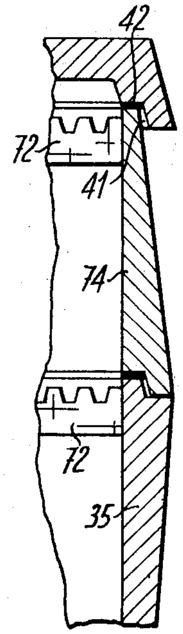
FIG. 24 is a partial section along line B—B of FIG. 4.

In this embodiment the hive described also has a frame covering feed-basin 80 shown more particularly in FIGS. 26 and 27. This frame-covering feed-basin is adapted to be fixed betwen the hive body and its roof 36 and comprises edges adapted to be pinched between the joint 42 of the roof and the ridge 71 of the hive body. The bottom of the frame-covering feed-basin is inclined downwardly towards its centre and comprises in its middle a central funnel 81. A folded rim 82 forms the side walls of the container adapted to contain the sugar syrup. This frame-covering feed-basin also comprises a transparent upper cover 83 the notched lower periphery of which enters into contact with the bottom of the feed-basin 80 about the central funnel 81. These notches are sufficiently large to allow the sugar syrup to penetrate between the central funnel and the rim of the cover 83 but do not permit the bees to pass. Under this cover is screwed a cup of transparent plastic 84 which permits the insertion of a mature queen-bee cell. Holes 85 made in the feed-basin and the openings in the cover 83 allow air to circulate freely under the roof 36. These frame-covering feed-basins being formed from a sheet of plastic material may be piled one on the other which greatly reduces the stocking volume of the same.

Special roofs are also provided for transport, more particularly shown in FIG. 28. These roofs are of stratified polyester and comprise outer flanges 86 which fit on the edges of the bodies or the upper supers of the hive. A grid 87 is fixed in the centre of the cover and permits very great upper ventilation during transport. With a view to transportation the hives can therefore be stacked one on top of the other so that the holes 39 in the floors are free for low ventilation.

FIGS. 31 to 36 show a five-frame Dadant breeding hive. This breeding hive comprises a body and a roof which, all proportions taken into account, are practically identical to those described with reference to the second embodiment of the hive. This body comprises a lower notched member 89 receiving the lower end of the frames suspended in the notched members 72.

The main difference between this breeding hive and the hives previously described resides in its flight device. This flight device is constituted by a drawer 90 of hollow unbreakable plastic material. It is coloured in the mass and this colour may correspond to the standard colours used for marking queen-bees. The hollow part of this drawer constitutes a feed-basin 91 inside which may be poured syrup through an opening made in its upper face and normally closed by a sliding cover 92. Two holes 93 give access to scored slopes 94 and allow access from the interior of the hive to the feed-basin 91.

Figure 31:
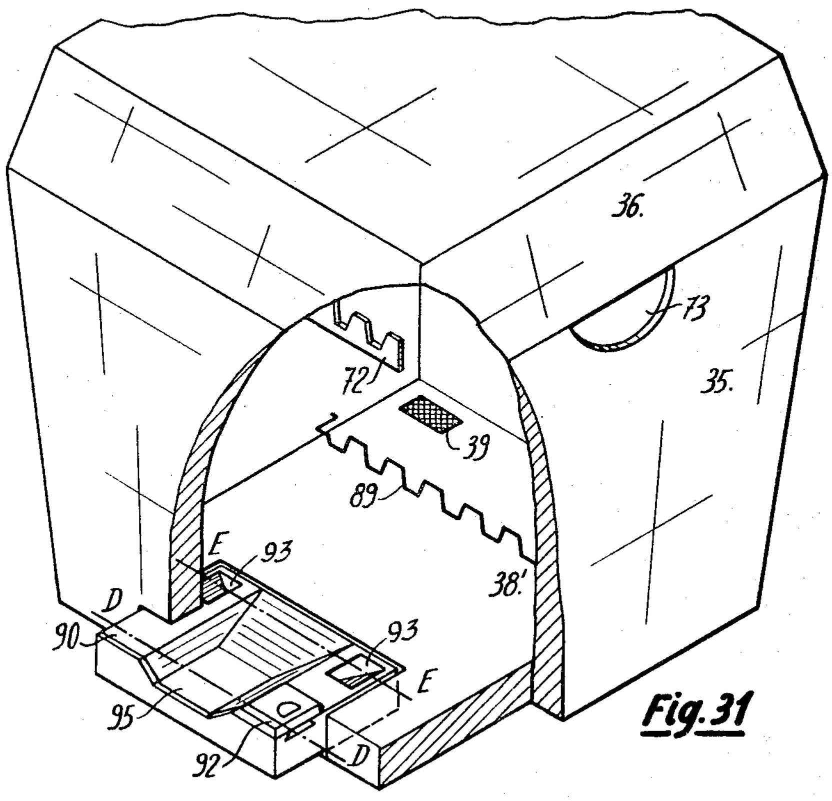
FIG. 31 shows a small hive.
Figure 36:
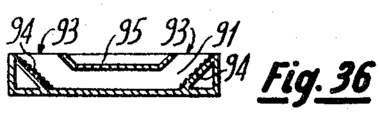
FIGS. 35 and 36 are sections along lines D—D and E—E respectively of the flying-off device.
Figure 35:
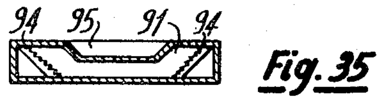
Figure 32:
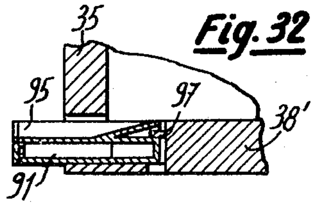
FIGS. 32 to 34 shows different positions of the flying-off device of this small hive.
Figure 34:
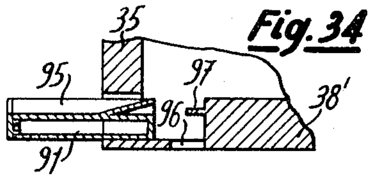

In its normal position this drawer is placed as shown in FIGS. 31 or 32 that is to say that it is fully inserted upright in the opening in the floor of the hive. When it is desired to unite two swarms, for example, one places this drawer in the position shown in FIG. 34 that is to say pulled forwardly so that the flight hole is closed but that on the other hand holes 96 in the floor 38' of the hive are free so that the bees may emigrate into a hive which has been disposed under the hive in question.

Figure 33:
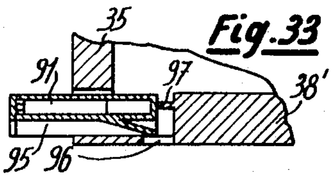

When it is desired to transport a swarm the drawer is engaged in the manner shown in FIG. 33; in this position the drawer is inverted and it closes the flight hole but due to the stop 97 carried by the front section of the recess formed in the floor 38 of the hive, this drawer cannot be engaged to the full and the holes 96 are only partly closed. These holes 96 which, when they are entirely free allow the bees to pass, prevent the latter from emerging when they are partly closed and then serve solely as low ventilation holes.

It is obvious that the three embodiments have been described by way of non limiting example but that numerous variants may be carried out without departing from the scope of the present invention.

I claim:

1. A hive comprising a hive body, a feed basin covering the hive body, the basin having an opening through the bottom thereof to permit bees to pass to the upper side of the feed basin, an upstanding marginal flange about said opening to prevent liquid feed from flowing through said opening, and a cover carried by said basin and spaced from and surrounding said flange, said cover having openings therethrough of a size to permit the flow of feed to adjacent said flange but to prevent bees from passing through the cover.

2. A hive as claimed in claim 1, said basin having side walls for retaining feed in the basin, and ventilating openings through the basin outside said side walls to permit the flow of air past the feed basin.

3. A hive as claimed in claim 2, and a cover disposed over the feed basin with marginal portions of the feed basin disposed between the upper end of said hive body and said cover.

4. A hive as claimed in claim 1, said basin having a bottom that inclines downwardly toward said flange.

5. A hive as claimed in claim 1, the hive having insulated side walls and a roof, the thickness of the insulation being greatest at the roof and the tops of the side walls and tapering progressively to a least thickness of insulation at the bottoms of the side walls.

6. A hive as claimed in claim 5, the hive having at least one opening through its lower front portion for the entry and exit of bees and at least one ventilating opening through its lower rear portion.

7. A hive comprising a hive body, the hive having a floor having a multiplicity of holes therethrough through which bees may pass, a first entrance for bees into the hive body above said floor, a second entrance for bees to beneath said floor, means for selectively opening said first entrance and closing said second entrance and for closing said first entrance and opening said second entrance, and means for catching pollen that falls from the bees as they crawl through said holes.

8. A hive as claimed in claim 7, said opening and closing means comprising a door, a member on which said door is mounted for vertical swinging movement, and means mounting said member for horizontal sliding movement selectively to open or close said door.

9. A hive as claimed in claim 7, said opening and closing means comprising a door, said pollen-catching means comprising a drawer horizontally slidably disposed beneath said floor, and cam means responsive to horizontal sliding movement of said drawer to open or close said door.

10. A hive as claimed in claim 7, the hive having insulated side walls and a roof, the thickness of the insulation being greatest at the roof and the tops of the side walls and tapering progressively at a least thickness of insulation at the bottoms of the side walls.

11. A hive as claimed in claim 10, said entrances being at the lower front portion of the hive, the hive having at least one ventilating opening through its lower rear portion.

12. A hive comprising a hive body, a feed basin covering the hive body, the basin having an opening through the bottom thereof to permit bees to pass to the upper side of the feed basin, an upstanding marginal flange about said opening to prevent liquid feed from flowing through said opening, a cover carried by said basin and spaced from and surrounding said flange, said cover having openings therethrough of a size to permit the flow of feed to adjacent said flange but to prevent bees from passing through the cover, the hive having a floor having a multiplicity of holes therethrough through which bees may pass, a first entrance for bees into the hive body above said floor, a second entrance for bees to beneath said floor, means for selectively opening said first entrance and closing said second entrance and for closing said first entrance and opening said second entrance, and means for catching pollen that falls from the bees as they crawl through said holes.

13. A beehive made exclusively out of synthetic resin comprising a body formed of a bottom and side walls, an opening in said bottom located near the rear face of the hive forming a cold air inlet, said body comprising internal and external mechanically resistant and waterproofed facings, an insulating synthetic foam structure sandwiched between said facings and in which the thickness of said insulating synthetic foam structure of said side walls increases progressively from the bottom side towards the upper edge of said side walls, said body comprising further a flight device formed of a drawer slidably mounted in said bottom and movable between at least two different operating positions; said beehive comprising further a cover formed of a top face and of lateral walls, said cover comprising internal and external mechanically resistant and watertight facings, an insulating synthetic foam structure sandwiched between said facings, the thickness of which structure increases progressively from the under edge of said lateral walls where it equals the thickness of the corresponding structure of the upper edge of the side walls of the body towards the top face, the lower edges of said lateral walls of the cover comprising formations corresponding to formations provided on the upper edge of the side walls of said body for positioning said cover on said body; a partition terminating the upper part of the body of the hive to avoid escape of bees when removing the said cover, said partition comprising perforations small enough not to let pass bees through them located on the one hand near the center portion of said partition to enable hot air to rise in the cover, and on the other hand near its outer periphery to enable the air from the cover to descend into the body of the hive.

References Cited

UNITED STATES PATENTS

| | | | |
|---|---|---|---|
| 23,192 | 3/1859 | Powers | 6—1 |
| 33,499 | 10/1861 | Smith | 6—1 |
| 860,852 | 7/1907 | Cary | 6—5 |
| 940,407 | 11/1909 | Sinnickson | 6—2 |
| 1,116,923 | 11/1914 | Rahn | 6—5 |
| 1,198,811 | 9/1916 | Aspinwall | 6—1 |
| 1,414,284 | 4/1922 | Jones | 6—5 |
| 1,659,640 | 2/1928 | Smith | 6—4 |
| 2,522,511 | 9/1950 | Hageman | 6—1 |
| 2,709,820 | 6/1955 | Wahl | 6—1 |
| 3,110,044 | 11/1963 | Dullas | 6—1 |
| 3,200,419 | 8/1965 | Root | 6—4 |

LUCIE H. LAUDENSLAGER, *Primary Examiner.*